United States Patent
Frtunikj et al.

(10) Patent No.: US 11,769,318 B2
(45) Date of Patent: Sep. 26, 2023

(54) SYSTEMS AND METHODS FOR INTELLIGENT SELECTION OF DATA FOR BUILDING A MACHINE LEARNING MODEL

(71) Applicant: Argo AI, LLC, Pittsburgh, PA (US)

(72) Inventors: Jelena Frtunikj, Bavaria (DE); Daniel Alfonsetti, Auburn, ME (US)

(73) Assignee: ARGO AI, LLC, Pittsburgh, PA (US)

( * ) Notice: Subject to any disclaimer, the term of this patent is extended or adjusted under 35 U.S.C. 154(b) by 352 days.

(21) Appl. No.: 17/101,633

(22) Filed: Nov. 23, 2020

(65) Prior Publication Data
US 2022/0164602 A1 May 26, 2022

(51) Int. Cl.
*G06V 10/774* (2022.01)
*G06N 20/00* (2019.01)
(Continued)

(52) U.S. Cl.
CPC ........ *G06V 10/774* (2022.01); *G06F 18/2115* (2023.01); *G06F 18/2148* (2023.01); *G06N 20/00* (2019.01); *G06V 10/255* (2022.01); *G06V 10/772* (2022.01); *G06V 10/82* (2022.01); *G06V 20/56* (2022.01); *G06V 20/58* (2022.01); *G06V 20/588* (2022.01); *G06V 20/64* (2022.01)

(58) Field of Classification Search
None
See application file for complete search history.

(56) References Cited

U.S. PATENT DOCUMENTS 7,793,188 B2  9/2010 Mukhopadhyay et al.
9,031,317 B2  5/2015 Yakubovich et al.
(Continued)

FOREIGN PATENT DOCUMENTS

CN  111914944 A  11/2020
WO  2020159568 A1  8/2020

OTHER PUBLICATIONS

Huang, H et al., "On the improvement of reinforcement active learning with the involvement of cross entropy to address one-shot learning problem" PLoS ONE (2019) 14(6): e0217408. available at https://journals.plos.org/plosone/article?id=10.1371/journal.pone.0217408.
(Continued)

*Primary Examiner* — Emily C Terrell
*Assistant Examiner* — Nathan J Bloom
(74) *Attorney, Agent, or Firm* — FOX ROTHSCHILD LLP (57) ABSTRACT

Systems and methods for selecting data for training a machine learning model using active learning are disclosed. The methods include receiving a plurality of unlabeled sensor data logs corresponding to surroundings of an autonomous vehicle, identifying one or more trends associated with a training dataset comprising a plurality of labeled data logs, determining a function for assigning an importance score to each of the plurality of unlabeled sensor data logs, using the one or more trends, using the function for assigning the importance score to each of the plurality of unlabeled sensor data logs, selecting a subset of the plurality of sensor data logs that have an importance score greater than a threshold, and using the subset of the plurality of sensor data logs for further training the machine learning model trained using the training dataset to generate an updated model.

22 Claims, 8 Drawing Sheets

(51) Int. Cl.
*G06V 10/20* (2022.01)
*G06V 20/56* (2022.01)
*G06F 18/214* (2023.01)
*G06F 18/2115* (2023.01)
*G06V 10/772* (2022.01)
*G06V 10/82* (2022.01)
*G06V 20/58* (2022.01)
*G06V 20/64* (2022.01)

(56) References Cited

U.S. PATENT DOCUMENTS

| | | | |
|---|---|---|---|
| 10,379,842 B2 | 8/2019 | Malladi et al. | |
| 10,489,222 B2 | 11/2019 | Sathyanarayana et al. | |
| 10,499,283 B2 | 12/2019 | Elias et al. | |
| 2017/0011281 A1* | 1/2017 | Dijkman | G06V 10/454 |
| 2017/0083792 A1* | 3/2017 | Rodríguez-Serrano | G06V 10/82 |
| 2019/0258904 A1 | 8/2019 | Ma et al. | |
| 2020/0005083 A1 | 1/2020 | Collins | |
| 2020/0081426 A1 | 3/2020 | Kane et al. | |
| 2020/0111005 A1 | 4/2020 | Ghosh et al. | |
| 2020/0202171 A1 | 6/2020 | Hughes et al. | |
| 2020/0272854 A1 | 8/2020 | Caesar | |
| 2021/0129845 A1* | 5/2021 | Bonk | G08G 1/0112 |
| 2021/0295201 A1 | 9/2021 | Kim et al. | |
| 2022/0164602 A1 | 5/2022 | Frtunikj et al. | |

OTHER PUBLICATIONS

Yoo, D. et al., "Learning Loss for Active Learning", arXiv:1905.03677 [cs.CV], May 9, 2019. available at: https://openaccess.thecvf.com/content_CVPR_2019/papers/Yoo_Learning_Loss_for_Active_Learning_CVPR_2019_paper.pdf.

Aussel, N. et al., "Combining federated and active learning for communication-efficient distributed failure prediction in aeronautics" 2019, hal-02446200f, available at https://hal.archives-ouvertes.fr/hal-02446200/document.

U.S. Appl. No. 17/124,413, filed Dec. 16, 2020, Autonomous Vehicle System for Intelligent On-Board Selection of Data for Training a Remote Machine Learning Mode.

International Search Report and Written Opinion dated Apr. 7, 2022, issued in International Application No. PCT/US2021/072897 (10 pages).

Information about Related Patents and Patent Applications, see section 6 of the accompanying Information Disclosure Statement Letter, which concerns Related Patents and Patent Applications.

U.S. Appl. No. 17/124,413, filed Dec. 16, 2020, Autonomous Vehicle System for Intelligent On-Board Selection of Data for Training a Remote Machine Learning Model.

Dave, H., "Active Learning Sampling Strategies", available at https://towardsdatascience.com/active-learning-sampling-strategies-f8d8ac7037c8 accessed on Nov. 17, 2020.

Nvidia AI, "Scalable Active Learning for Autonomous Driving", Dec. 18, 2019, available at https://medium.com/nvidia-ai/scalable-active-learning-for-autonomous-driving-a-practical-implementation-and-a-b-test-4d315ed04b5f accessed Nov. 17, 2020.

Wei, X., "Deep Active Learing for 3D Object Detection for Autonomous Driving", Degree Project in Computer Science and Engineering, Second Cycle, Stockholm, Sweden, Nov. 22, 2019, available at http://www.diva-portal.org/smash/get/diva2:1415945/FULLTEXT01.pdf.

Liu, S. et al., "Edge Computing for Autonomous Driving: Opportunities and Challenges", Proceedings of the IEEE, vol. 107, No. 8, Aug. 2019, available at http://weisong.eng.wayne.edu/_resources/pdfs/liu19-EdgeAV.pdf.

Cai, S. et al., "Data Collection in Underwater Sensor Networks Based on Mobile Edge Computing", IEEE Access, (2019) vol. 7, pp. 65357-65367, available at https://ieeexplore.ieee.org/stamp/stamp.jsp?arnumber=8719985.

* cited by examiner

SYSTEMS AND METHODS FOR INTELLIGENT SELECTION OF DATA FOR BUILDING A MACHINE LEARNING MODEL

BACKGROUND

It is important to the operation of autonomous vehicles to be able to predict or forecast object trajectories that includes correctly detecting objects in the environment of the autonomous vehicle. Accurate forecasts of object behavior enables an autonomous vehicle to implement anticipatory planning and control rather than being reactive to its environment. This results in a more natural driving behavior by the autonomous vehicle as well as improved comfort and safety for its passengers.

Autonomous vehicles collect a large amount of data from numerous sensors in order to perform object detection and object behavior prediction. It is important to obtain real-world data regarding vehicle events that can be used to develop, evaluate, and/or test systems for vehicle control. However, real-world vehicle events of interest are sparse and difficult to isolate from continuously collected real-world data, because the total real-world datasets from driving sessions often contain redundancies and/or large quantities of irrelevant or less-relevant information as related to vehicle operations.

Typically, a passive learning method accepts randomly selected training data. However, such random selection of training data requires expensive labeling which might not improve the training of the machine learning model (e.g., when the randomly selected training data does not include useful information). In active learning, "useful" data is selected for subsequent training of a machine learning model, instead of passively accepting randomly selected data. Active learning can significantly reduce the amount of data required for training, test and/or validation of a machine learning model, compared to passive learning while achieving similar or better object detection (including classification as well as bounding box regression) accuracy as passive learning. However, current active learning methods do not take into account information about the environment of the autonomous vehicle in which it is operating and/or will operate during selection of data samples.

This document describes methods and systems that are directed to addressing the problems described above, and/or other issues.

SUMMARY

In various implementations, systems and methods for training a machine learning model using active learning are disclosed. The system may include a processor and a non-transitory computer readable medium including programming instructions that may be executed by the processor to perform the methods of this disclosure. The methods include receiving a plurality of unlabeled sensor data logs corresponding to surroundings of an autonomous vehicle from a plurality of sensors. The methods then include identifying one or more trends associated with a training dataset (and/or other datasets such as validation dataset/test dataset) that includes a plurality of labeled data logs, and determining a function for assigning an importance score to each of the plurality of unlabeled sensor data logs using the one or more trends. The training dataset is used for training a machine learning model. The methods then include using the function for assigning the importance score to each of the plurality of unlabeled sensor data logs, selecting a subset of the plurality of sensor data logs that have an importance score greater than a threshold, and using the subset of the plurality of sensor data logs for further training the machine learning model trained using the training dataset to generate an updated model.

In some implementations, the methods may also include identifying a bounding box and an associated label within each of the plurality of sensor data logs (e.g., using the machine learning model trained using the training dataset), and determining a confidence score of the machine learning model trained using the training dataset for identifying the associated label. The system may then use the confidence score in determining the function. The machine learning model may be an object detection model. Optionally, the confidence score may be determined based on the following example features associated with the machine learning model trained using the training dataset: an actual accuracy, a desired accuracy, a false positive rate, a false negative rate; a convergence, an output, a statistical fit, identification of a problem being solved and/or a training status.

Alternatively and/or additionally, the methods may also include receiving metadata associated with each of the plurality of labeled data logs in the training data sets, and using the metadata for identifying the one or more trends. The metadata may include, for example, a time of capture of a data log, a location of capture of a data log, information relating to environmental conditions at a location or time of capture of a data log, or information relating to one or more events a location or time of capture of a data log.

Optionally, the one or more trends may be used to identify one or more characteristics in the plurality labeled data logs of the training dataset that are underrepresented. Examples of such characteristics can include, for example, a label class count, a label count by time; a label count by location; an event class count; an event class count by time, an event class count by location, an instance count by environmental conditions, or a machine learning model uncertainty.

In certain other implementations, the methods may also include receiving metadata associated with the sensor data logs. Examples of such metadata can include, without limitations a time of capture of a data log, a location of capture of a data log, information relating to environmental conditions at a location or time of capture of a data log, or information relating to one or more events a location or time of capture of a data log. Optionally, the methods may also include using the function for assigning the importance score to each of the plurality of unlabeled sensor data logs by assigning a score to one or more of a plurality of characteristics of the data log. The plurality of characteristics can include, without limitation, a label class count, a label count by time, a label count by location, an event class count, an event class count by time, an event class count by location, an instance count by environmental conditions, or a machine learning model uncertainty.

Optionally, the system may discard one or more of the plurality of sensor data logs that have an importance score less than the threshold.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

A variety of algorithms for control and navigation of autonomous vehicles, such as object detection algorithms for detecting objects in images, use machine learning models that are built using labeled data (e.g., training data, test data, validation data, etc.). While training such models require a large amount of training data (i.e., labeled images), it is not feasible to use all or majority of data collected by an autonomous vehicle because of processing, cost, and timing constraints. Furthermore, one of the biggest training hurdles for autonomous vehicles is identifying edge cases such as unexpected roadblocks, exotic animals, unusual road signs, a truck towing a trailer towing a quad bike (which an object detection model could distinguish as two or even three separate vehicles). While training a machine learning model to recognize common objects and scenarios is relatively straightforward, teaching it to recognize unusual conditions and objects on the road can be complex and requires enough labeled data to account for these edge cases.

However, the selection of high-quality labeled training examples (and/or validation/test examples) amongst the virtually unlimited sensor data collected by vehicles available to the machine learning algorithm is typically costly. In active learning, "useful" data (e.g., wrongly predicted label, uncertain prediction label, edge case labels, diverse data etc.) is selected for subsequent building (i.e., training, validation and test) of a machine learning model, instead of passively accepting randomly selected data. However, current active learning methods do not take into account information about the environment of the autonomous vehicle in which it is operating and/or will operate (e.g., location, time of day, etc.), information about already existing training data and labels (and/or validation/test data), information about various events (e.g., takeover, lane change, truck towing a vehicle, etc.) during selection of data samples.

Aspects of the current disclosure improve building—including training, test and/or validation—of machine learning models by intelligently selecting useful and/or important data samples for annotation and/or use in training, test and/or validation of a machine learning model using a data (or information) driven data selection model.

Figure 1:
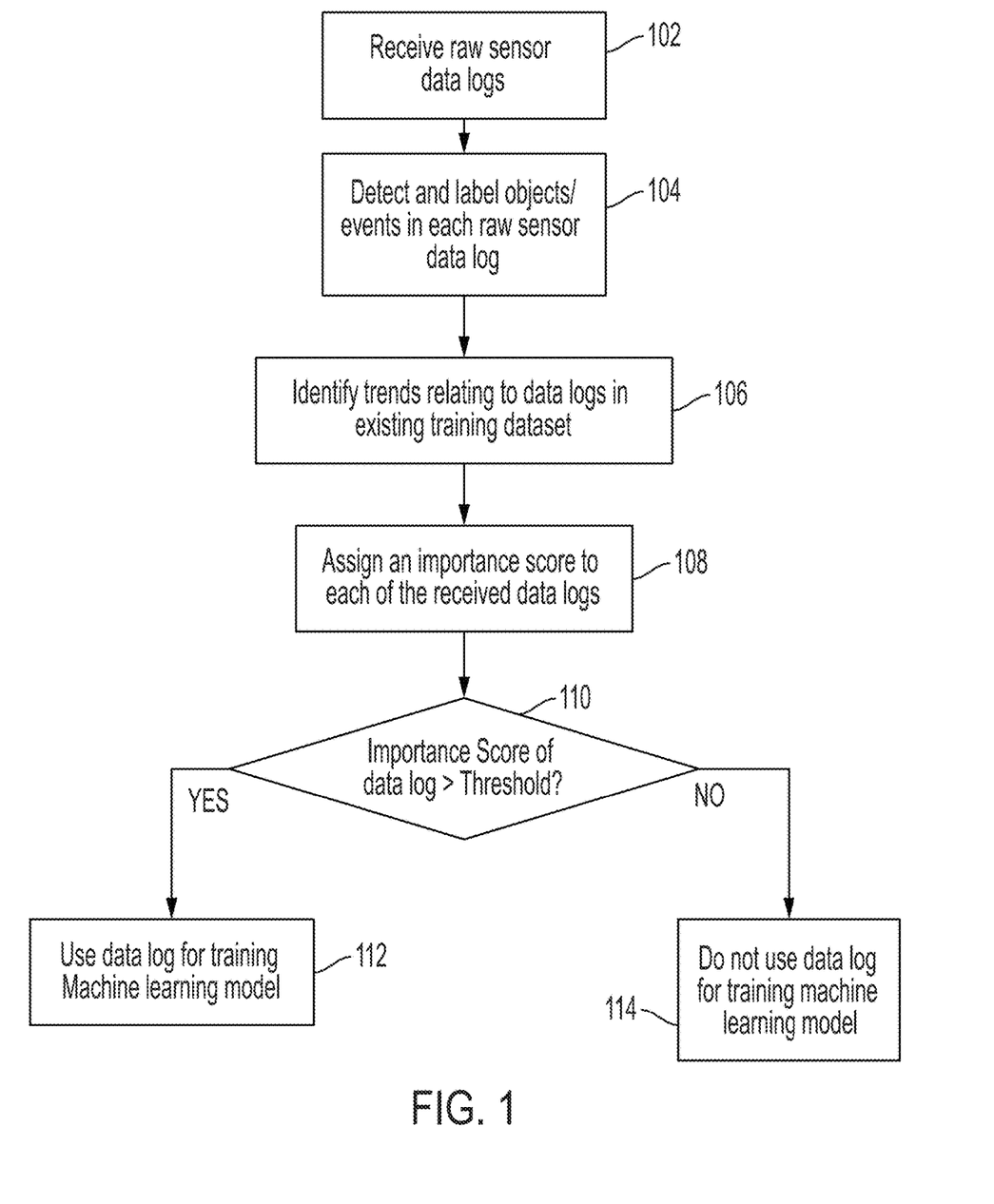
FIG. 1 illustrates a flow chart of an example method for intelligent selection of data for training a machine learning model according to an embodiment.

Referring now to FIG. 1, a flowchart illustrating an example method for selection of relevant data for use in building of a machine learning model. The method can be performed in real or near-real time (e.g., as the image data is recorded), after a delay (e.g., using previously stored sensor data), or at any suitable time. The method can be performed a predetermined number of times for a driving session, iteratively performed at a predetermined frequency for a driving session, or performed at any suitable time. Multiple instances of the method can be concurrently performed for multiple concurrent driving sessions (e.g., for different vehicles, via different vehicle systems). However, any suitable number of method instances can be performed at any suitable time. It should be noted that while the method describes selection of training data, the disclosure is not so limiting and similar principles can be used for selection of test data, validation data, or the like.

At 102, the system may receive raw data logs collected (e.g., recorded, obtained, etc.) by sensors mounted on a vehicle during operation (e.g., driving). The received data logs are unlabeled. Examples of such raw data logs may include, without limitations, point clouds, 2D images, 3D images, audio logs, or the like. Data logs can include single data points (e.g., single images, single point cloud frames), data sequences (e.g., an image sequence, a video, bursts of point cloud frames, etc.), and/or any other suitable data sample. A single "log" of sensor data refers to data collected by a sensor over a contiguous time period "t". The data logs can include sensor measurement data in frames or scans over time, such as periodically, intermittently, in response to sensing events, or the like. Data logs data can be recorded constantly (e.g., continuously), periodically, randomly, upon occurrence of a trigger event (e.g., a driving event, a data value or signal exceeding a threshold value, etc.), and/or with any other suitable temporal characteristics.

In various implementations, each of the received data logs may include metadata such as, without limitation, a time stamp indicating the time of collection of the data log, location information and/or map information corresponding to the location from which the data log was collected, information relating to the environmental conditions (e.g., rainy, cloudy, sunny, etc.) at the time and location when the data log was collected, information relating to one or more events at the time and location when the data log was collected (e.g., generally a high traffic time, near-critical event, collision event, take-over event, etc.), or the like. Optionally, the system may receive metadata about the data logs from other data stores (e.g., weather database, traffic database, satellite image database, or the like), associate the data logs with the appropriate metadata. For example, the system may receive location data corresponding to the data log based on a route history of the vehicle used for collecting the data log and time stamps of the data log. The system may then query various databases to receive weather information, traffic information, event information, etc. relating to the data log.

At 104, system may detect and label one or more objects and/or events in each received raw data log (e.g., point cloud, camera image, etc.). For example, an example object detection model (e.g., a convolutional neural network (CNN), a mask R-CNN, etc.) may be used to detect and label one or more objects and/or events in each received raw data log. The object detection model may output an image or point cloud that includes bounding boxes surrounding the detected objects and/or labels for the objects. A bounding box indicates a region of the unlabeled data log that is believed to contain an identified object. Thus, the bounding box may be assigned a label indicating the identified object that is believed to be contained within the bounding box.

Each detected object may be represented by its location (centroid or center point), boundary, label class, or even size. In an embodiment, the object detector can output an image or point cloud that includes bounding boxes surrounding the detected objects and/or labels for the detected objects.

Figure 2A:
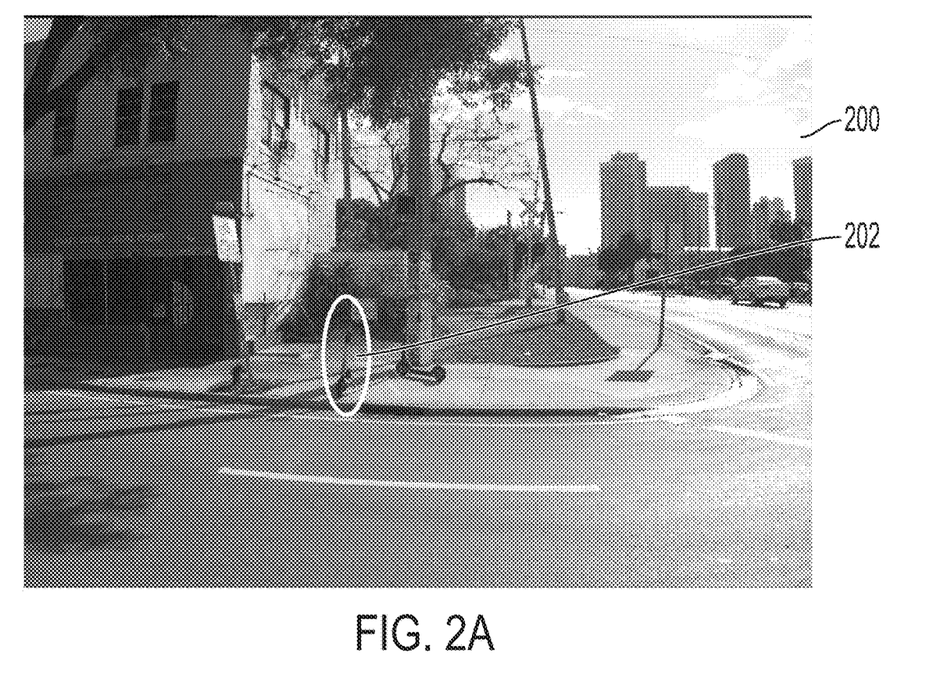
FIG. 2A illustrates an example data log including an unlabeled image.

The system may also identify a confidence score associated with each bounding box and/or identified label that indicates a degree of likelihood of the identified object being present in a portion of the unlabeled raw data enclosed by the bounding box or a degree of confidence that the object detected was correctly labeled. Specifically, the object detection model produces for each bounding box a confidence score which indicates a likelihood that the label assigned to the bounding box is correct (i.e., that the object associated with the label is depicted in the bounding box). The confidence score may be generated based on the object detection model's classification accuracy for the identified object/label. Optionally, the value of the confidence score may be from about 0.0 to about 1.0. For example, FIG. 2A illustrates an example where the data log is an image 200 including an object 202 that is an orange scooter. Upon analysis of the image 200, an object detection model generates a bounding box 204 around the orange scooter and labels it as "construction" based on the orange color with a confidence score of 0.6 (shown in FIG. 2B). A bounding box containing a car may have a bounding box score of 1.00 (or even higher), that indicates that the car was detected and correctly labeled as a "car" with about 100% accuracy.

Optionally, the system may also identify one or more properties of the machine learning model(s) which will be trained using the data log (e.g., an object detection model), and use the identified properties for determining the confidence score of the machine learning model associated with predicting each of a plurality of labels. Examples of the properties may include, without limitation, the actual and/or desired accuracy, false positive rate, false negative rate, convergence, statistical fit, output of the machine learning model, problem being solved using the machine learning model, training status of the machine learning model, or the like.

Figure 3A:
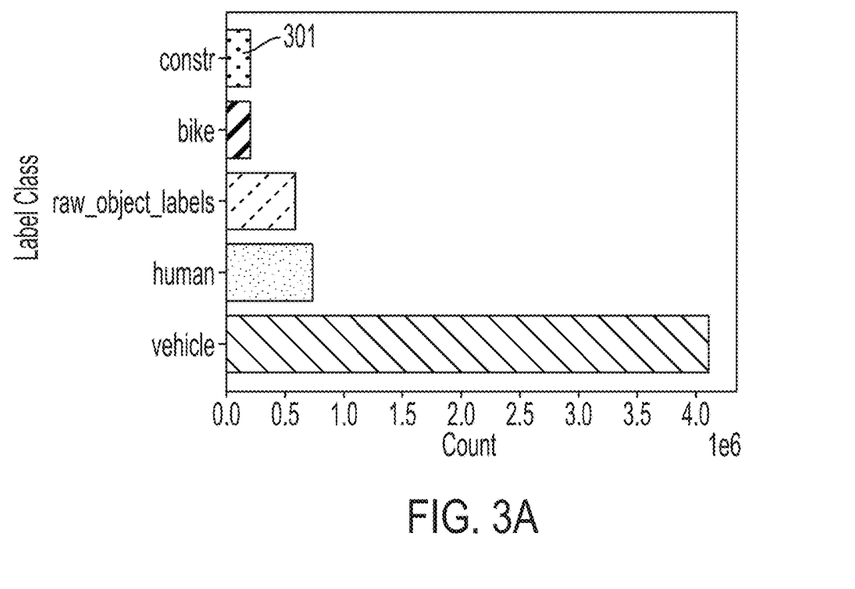
FIGS. 3A-3C illustrate example distribution/trends within a training dataset.
Figure 3B:
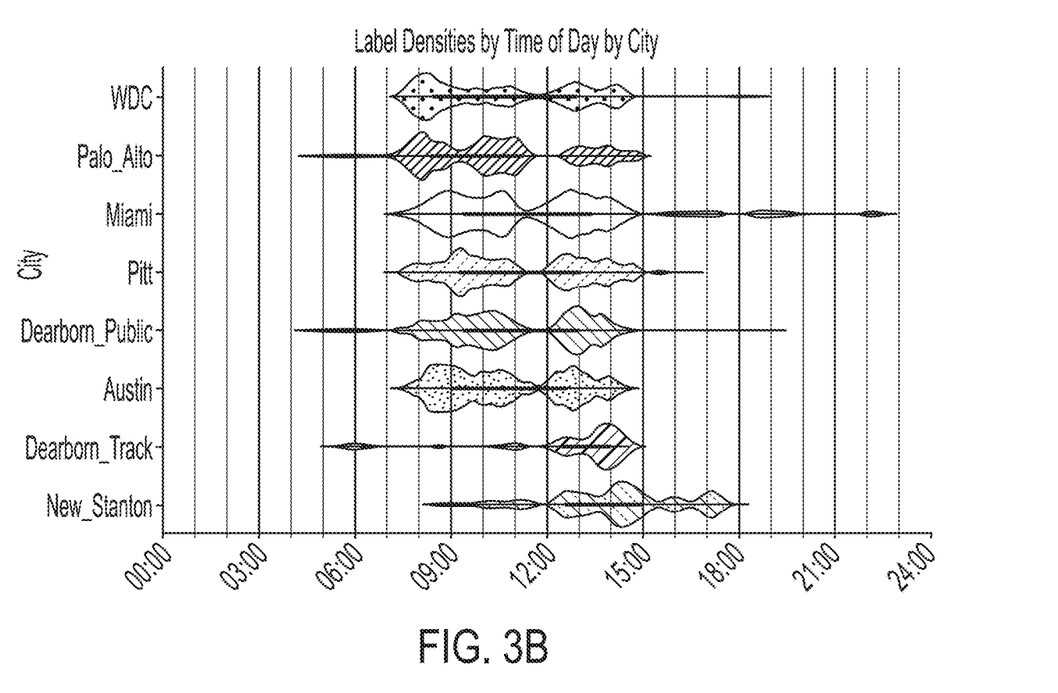
Figure 3C:
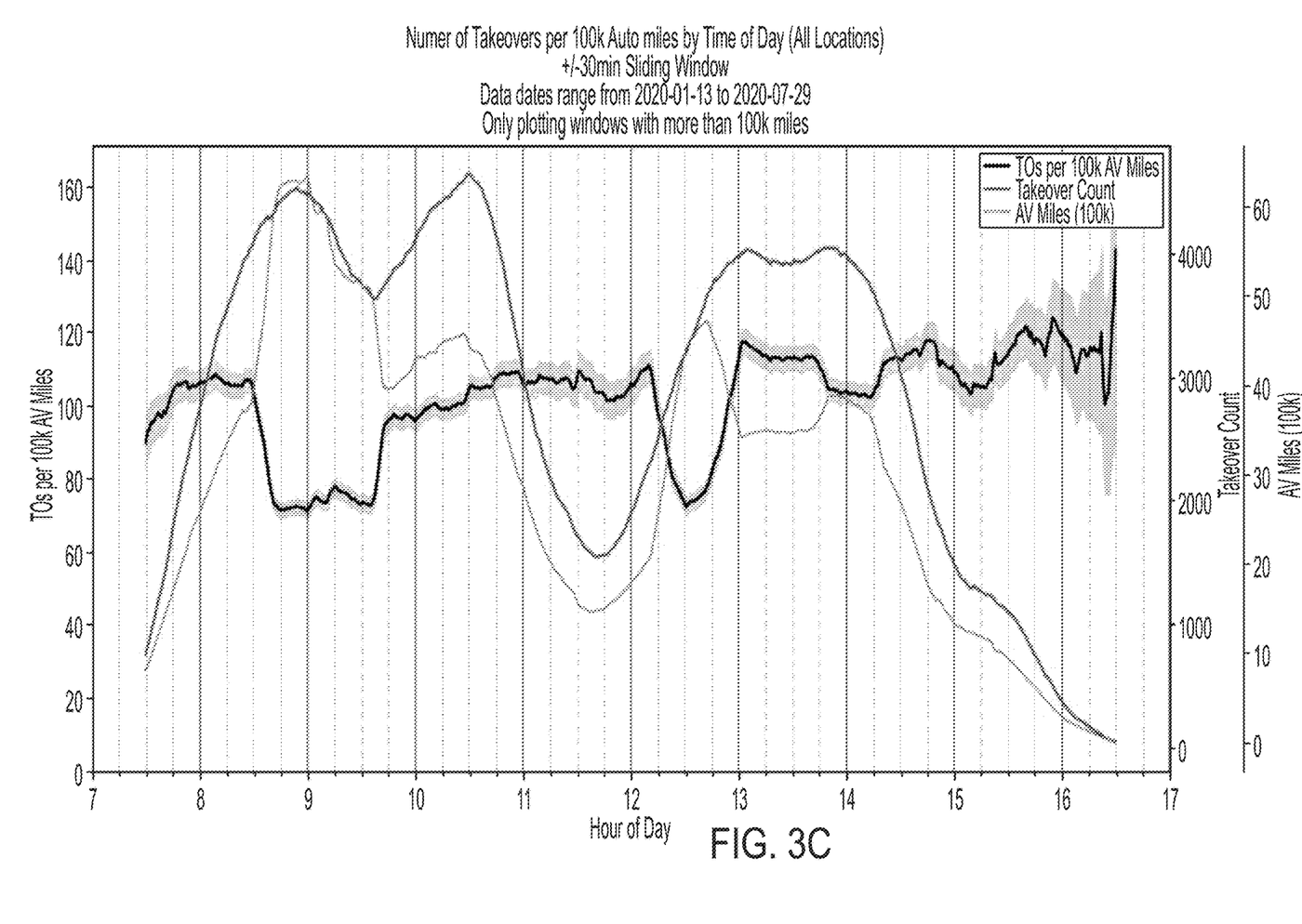

At 106, the system may identify distributions and/or trends relating to data logs (e.g., occurrence of, percentage of objects, events, and/or instances within data logs) within existing training data sets (including already labeled data). Such identification may include analysis of various labels in the training dataset as well as metadata associated with the data logs in the training dataset (e.g., location of collection, time of collection, events, etc.). Example data distributions are shown in FIGS. 3A-3C.

In certain implementations, the system may use the distributions and/or trends to identify object classes (i.e., labels), objects, events, and/or instances that are missing or are not adequately represented in the training data. For example, some types of objects (e.g., construction vehicles, tow trucks, etc.) may be missing and/or inadequately represented in a training data set; data logs associated with events (e.g., vehicles not stopping at a red light; lane change events; take over events, etc.) may be missing and/or inadequately represented in a training data set); data logs collected at certain times and/or locations (e.g., night time, morning rush traffic time, parking lots, rainy days, etc.) may be missing and/or inadequately represented in a training data set; or the like. FIG. 3A illustrates an example label class count distribution of a training dataset, and can be used to identify label classes that are underrepresented in the training dataset (e.g., data logs relating to construction 301 in FIG. 3A). Similarly, FIG. 3B illustrates label densities of a training dataset by time of day and location, and can be analyzed to identify that data logs between 11:30 AM and 12:30 PM are underrepresented in the training dataset.

In other examples, certain types of objects, events, and/or instances that need to be included and/or overrepresented in the existing training data and may also be identified by the system, using similar principles. For example, FIG. 3C illustrates a training dataset distribution for the number of takeovers per 100,000 vehicle miles by time of day (i.e., event distribution). It may be inferred from the distribution of FIG. 3C that there are more takeover events during rush hour, and more takeover events need to be included in the training dataset for improving performance of a machine learning model during rush hour.

At 108, the system may assign an importance score to each of the received data logs (from step 102) based on the confidence score of step 104 as well as the existing training dataset trends/distributions of step 106. The importance score of a data log is indicative of whether or not the data log will be useful for training a machine learning model. A data log is "useful" if it can, for example, be used for initially training a machine learning model, reduce training time, improve the accuracy of a machine learning model, reduce overfitting (i.e., the log data has reduced redundancy), or the like. A data log may be useful for correction learning and/or positive reinforcement learning. For example, events or objects detected within a data log that indicate incorrect detection results may be labeled as such so that they can be used to adjust the models for better future performance (i.e., correction learning in which a model learns from mistakes). Events that indicate correct detection results may also need to be labeled as such so that they can be used to reinforce the models instead of correction (i.e., positive reinforcement learning).

For assigning importance scores to data logs, the system may first define an importance function that can be used to analyze various features of the data log for determining importance scores of data logs with respect to training a machine learning model. The importance function combines the confidence score for predicting a label in the data log using the machine learning mode with the trends/distributions of the existing training dataset, and assigns an importance score indicative of whether or not the data log will improve the training of the machine learning model.

Examples of the features may include, without limitation, label class count, label count by time and location, event class count, event class count by time and location, instance count by environmental conditions (e.g., rain, low light, occlusions, etc.), machine leaning model uncertainty, congruence of the data logs with various events (e.g., near/almost collision events during takeover, etc.), or the like. The defined function may assign a percentile score or rank to each of the features of the data log, and combine the feature scores for determining the importance score of the data log. For example, the importance function may compare the confidence score to threshold(s) to determine whether the confidence score needs to be improved for a certain label class, and may assign a higher importance to data logs that have a low confidence score of object detection. Similarly, the importance function may assign a higher importance to data logs that include class labels, event labels, environment factors that are not adequately represented in the existing data set.

At 110, the system may determine whether the importance score of a data log is greater than a threshold. If the importance score of the data log is greater than (or equal to) the threshold (110: YES), the system may use the data log for further annotation (e.g., manual labeling) and/or for building (i.e., training, testing, validating, updating, etc.) a machine learning model (112). The system may not use the data log for updating/training a machine learning model (114) if the importance score of the data log is less than the threshold (110: NO). Optionally, the system may discard data logs whose importance score is less than the threshold.

Figure 2B:
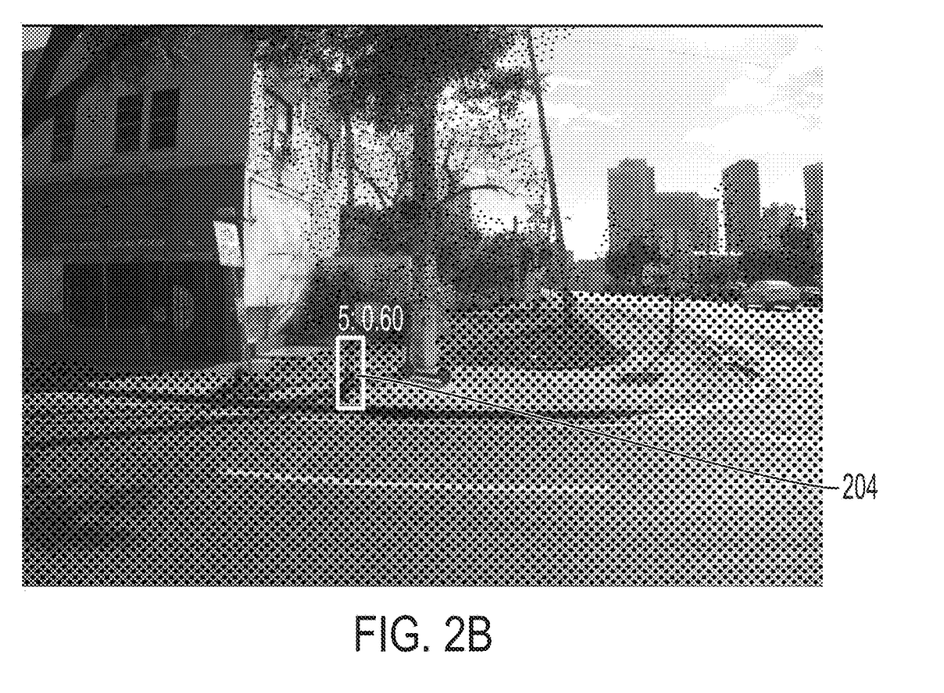
FIG. 2B illustrates the image of FIG. 2A including detected bounding box(es) and corresponding class.

For example, referring to a data log including the image shown in FIGS. 2A and 2B, the importance function may assign a high importance score (i.e., greater than the threshold) to the image for two reasons: (1) the construction class (label class count) is important because construction labels are underrepresented in the existing training dataset (class data distribution in FIG. 3A), and there is an object in the image classified as construction; (2) the object detection model is uncertain with respect to the classification of the orange scooter (low confidence score of 0.6 for classifying it as a construction). Therefore, the importance function will assign a high scores to the data log with respect to the features label class count and confidence score. This is because if the training dataset included more construction labels, and more objects that look like construction labels but not in fact construction labels (i.e. the orange scooter which is a false positive construction label), then the detection algorithm would be less likely to mistake orange objects as construction cones in the future.

Figure 4A:
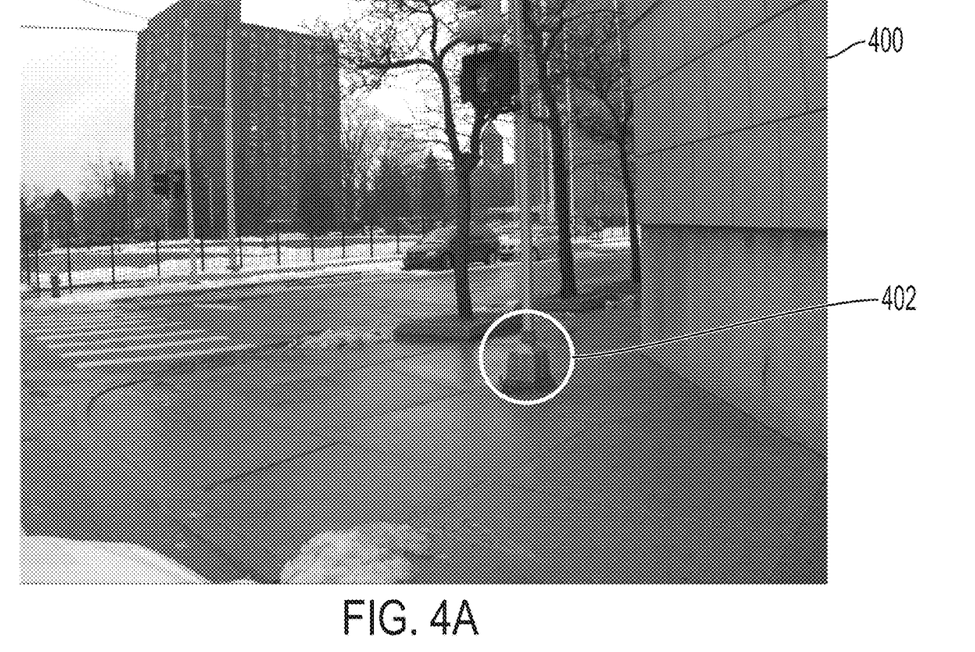
FIG. 4A illustrates an example data log including an unlabeled image.
Figure 4B:
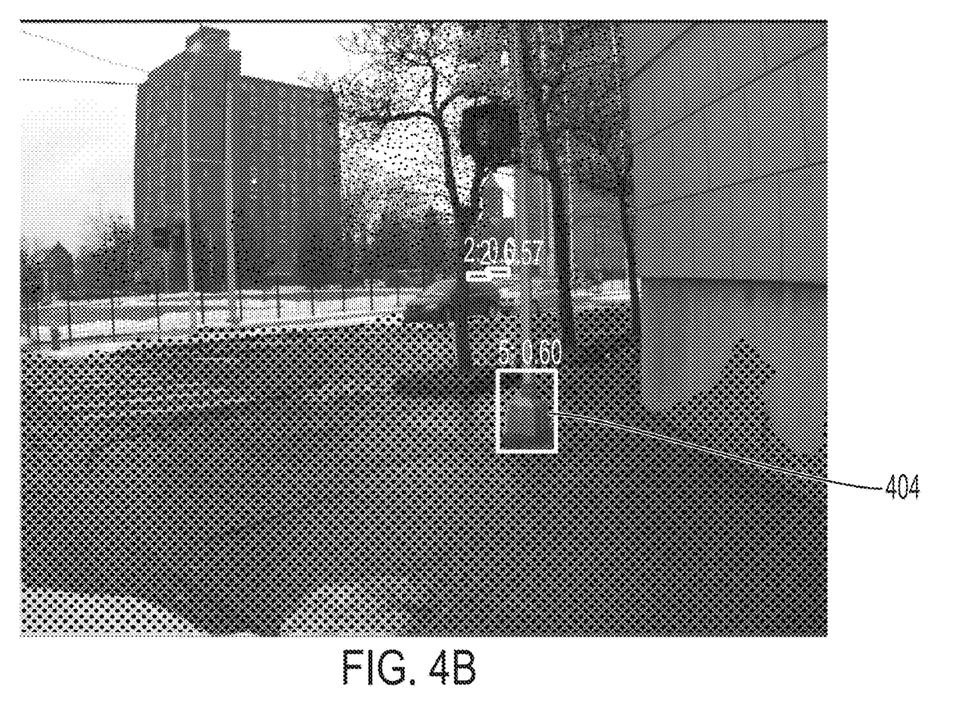
FIG. 4B illustrates the image of FIG. 4A including detected bounding box(es) and corresponding class.

In another example shown in FIGS. 4A and 4B, FIG. 4A illustrates an example where the data log is an image 400 including an object 202 that is the base of a pole. Upon analysis of the image 400, an object detection model generates a bounding box 404 around the pole base and labels it as "construction" (based on the shape of the base that resembles a construction cone) with a confidence score of 0.6 (shown in FIG. 4B). The importance function may assign a high importance score (i.e., greater than the threshold) to the image for two reasons: (1) the construction class (label class count) is important because construction labels are underrepresented in the existing training dataset (class data distribution in FIG. 3A), and there is an object in the image classified as construction; (2) the object detection model is uncertain with respect to the classification of the pole base (low confidence score of 0.6 for classifying it as a construction). Therefore, the importance function will assign a high score to the data log with respect to the features label class count and confidence score. This is because if the training dataset included more construction labels, and more objects that look like construction labels but not in fact construction labels (i.e. the pole base which is a false positive construction label), then the detection algorithm would be less likely to mistake conical structures such as pole bases as construction cones in the future.

Thousands of data logs with labels and confidence scores can be collected from perception modules in autonomous vehicles and stored in a database. Since there is too much sensor data to store in a practical system, the active learning system disclosed herein helps reduce the amount of data logs stored in the database by identifying erroneous annotations (i.e., labels) in the database which need to be manually labeled as well as which are important for building a machine learning model. This balances quantity and quality of data logs in the database to optimize system performance and cost. Moreover, the effects of different kinds of detection and labeling errors (e.g., missing objects, inaccurate position) on performance can be analyzed. A machine learning model is trained and/or built by adjusting its operating parameters until a desirable training output is achieved. The determination of whether a training output is desirable may be accomplished either manually or automatically by comparing the training output to the known characteristics of the training data. A machine learning model is considered to be trained or built when its training output is within a predetermined error threshold from the known characteristics of the training data. Examples of machine learning models may include, without limitation, tracking models, shape estimation models, object detection models, pose estimation models, classification and labeling models, segmentation models, motion planning models, forecasting models, prediction models, or the like.

While the above description relates to selection of raw or unlabeled images for subsequent labeling and for training a machine learning model that performs object detection, the disclosure is not so limiting. In particular, the methods and systems of this disclosure can be used for selection of any kind of raw data for training of many different kinds of models such as, without limitation, tracking models, motion planning models, forecasting models, prediction models, or the like. For example, considering a prediction model for predicting whether a pedestrian is going to cross a zebra crossing based on, for example, closeness of a pedestrian to a zebra crossing, body orientation, face features, or the like, the systems and methods of this disclosure may be used to identify an importance function for selecting data for building the prediction model. In such examples, the importance function may be based on features, such as statistics about data (e.g. where people tend to jaywalk because the zebra crossing is too far), time of day when people do or do not use a zebra crossing, effect of traffic conditions on the crossing, or the like; in order to select useful data for building the model.

It should be noted that the methods described in this disclosure for intelligent selection of data logs may be executed on-board an autonomous vehicle, at a remote computing device that is not part of an autonomous vehicle, or combinations thereof.

Figure 5:
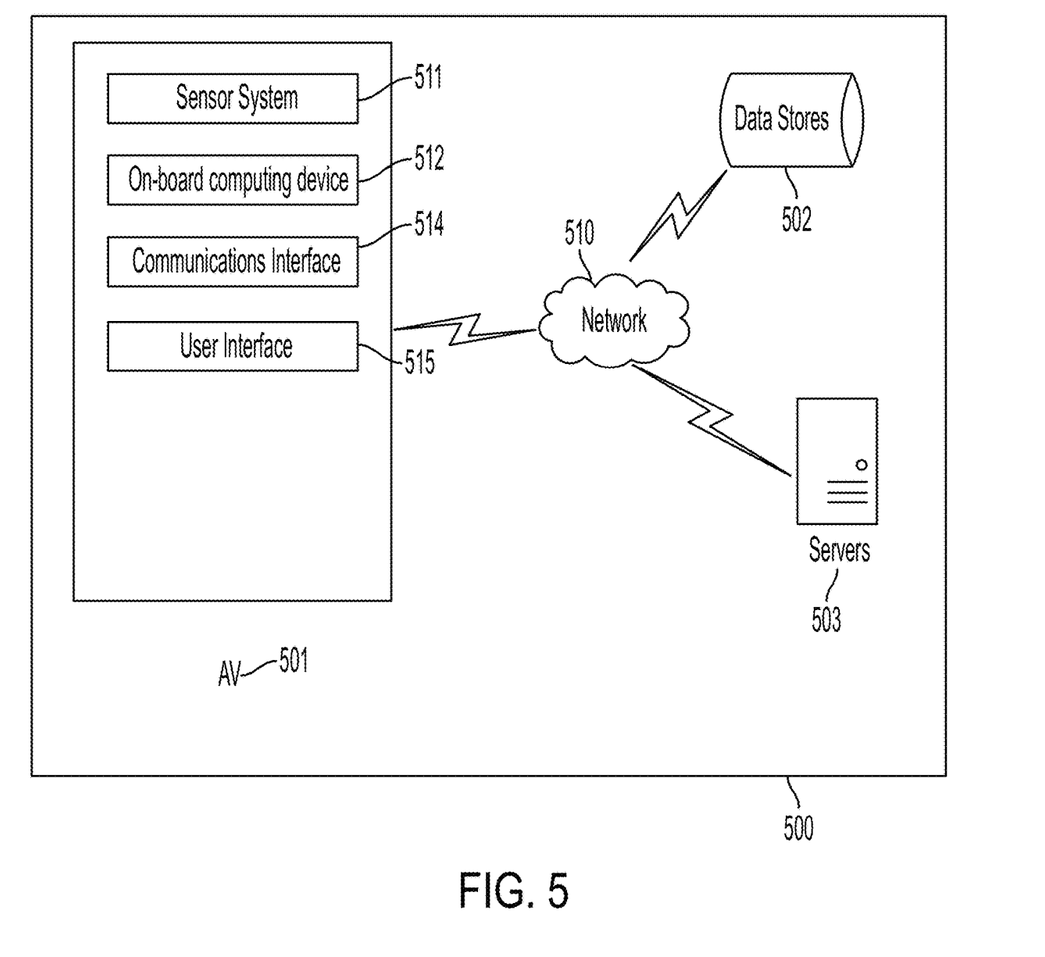
FIG. 5 is a block diagram illustrating an example autonomous vehicle system.

FIG. 5 is a block diagram illustrating an example system 500 that includes an autonomous vehicle 501 in communication with one or more data stores 502 and/or one or more servers 503 via a network 510. Although there is one autonomous vehicle shown, multiple autonomous vehicles may be communicatively coupled to each other and/or communicatively coupled to data stores 502 and/or servers 503 over network 510. Network 510 may be any type of network such as a local area network (LAN), a wide area network (WAN) such as the Internet, a cellular network, a satellite network, or a combination thereof, and may be wired or wireless. Data store(s) 502 may be any kind of data stores such as, without limitation, map data store(s), historical information data store(s), traffic information data store (s), user information data store(s), point of interest data store(s), or any other type of content data store(s). Server(s) 503 may be any kind of servers or a cluster of servers, such as, without limitation, Web or cloud servers, application servers, backend servers, or a combination thereof.

As illustrated in FIG. 5, the autonomous vehicle 501 may include a sensor system 511, an on-board computing device 512, a communications interface 514, and a user interface 515. Autonomous vehicle 501 may further include certain components (as illustrated, for example, in FIG. 5) included in vehicles, such as, an engine, wheels, steering wheel, transmission, etc., which may be controlled by the on-board computing device 512 using a variety of communication signals and/or commands, such as, for example, acceleration signals or commands, deceleration signals or commands, steering signals or commands, braking signals or commands, etc.

The sensor system 511 may include one or more sensors that are coupled to and/or are included within the autonomous vehicle 501 and that are configured for sensing or measuring properties of the autonomous vehicle's environment. Examples of such sensors include, without limitation, a LIDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 501, information about the environment itself, information about the motion of the autonomous vehicle 501, information about a route of the autonomous vehicle, or the like. As autonomous vehicle 501 travels over a surface, at least some of the sensors may collect data pertaining to the surface.

The LIDAR system may include a sensor configured to sense or detect objects in an environment in which the autonomous vehicle 501 is located using light. Generally, LIDAR system is a device that incorporates optical remote sensing technology that can measure distance to, or other properties of, a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam, and scan the beam to generate two dimensional or three dimensional range matrices. In examples, the LIDAR system may include components such as light (e.g., laser) source, scanner and optics, photo-detector and receiver electronics, and position and navigation system. In an example, The LIDAR system may be configured to use ultraviolet (UV), visible, or infrared light to image objects and can be used with a wide range of targets, including non-metallic objects. In one example, a narrow laser beam can be used to map physical features of an object with high resolution. A field of view may be illuminated with a wide diverging laser beam in a single pulse and/or point-by-point.

Figure 6:
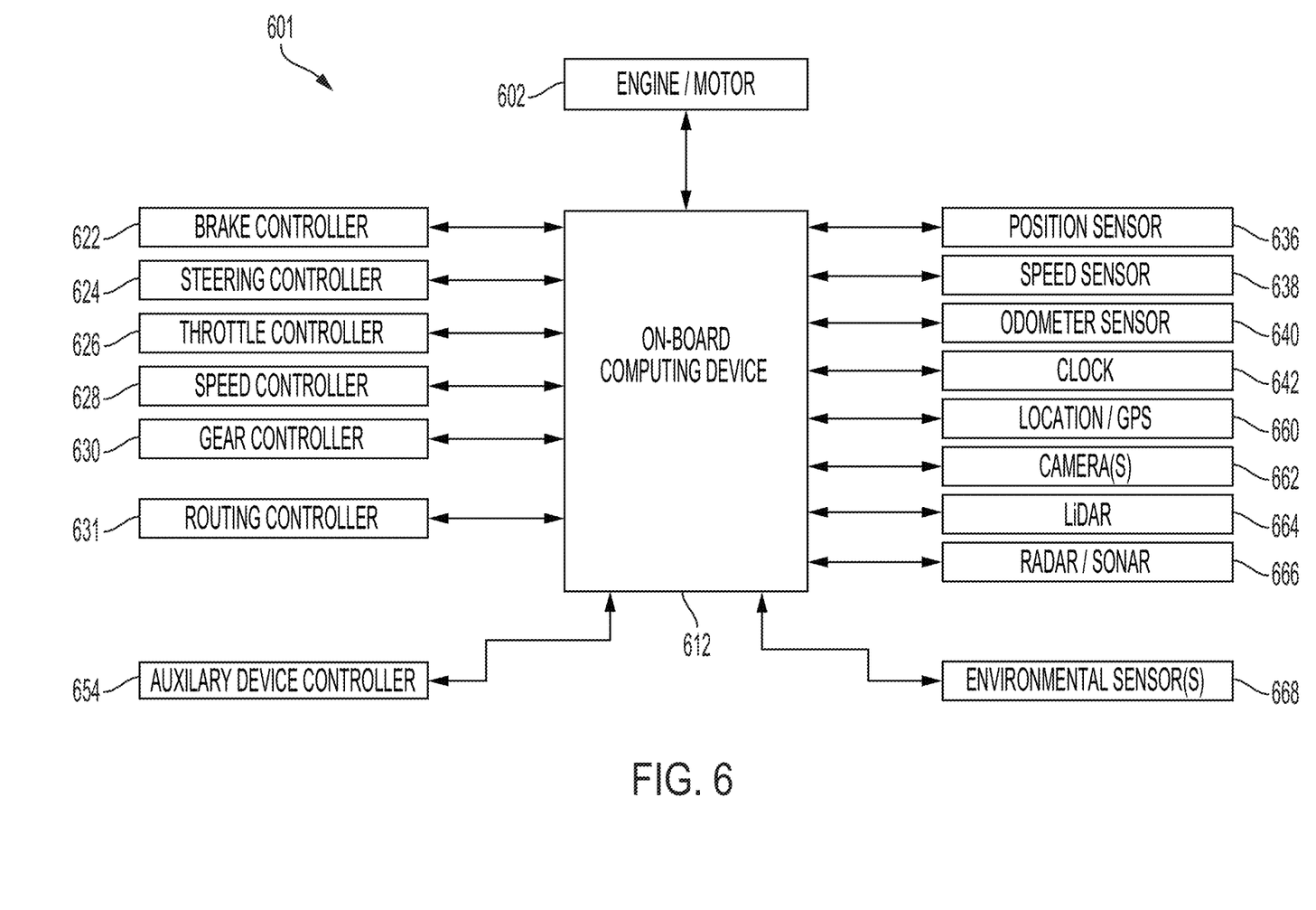
FIG. 6 illustrates an example vehicle controller system.

FIG. 6 illustrates an example system architecture for a vehicle 601, such as the autonomous vehicle 501 of FIG. 5 autonomous vehicle. The vehicle 601 may include an engine or motor 602 and various sensors for measuring various parameters of the vehicle and/or its environment. Operational parameter sensors that are common to both types of vehicles include, for example: a position sensor 636 such as an accelerometer, gyroscope and/or inertial measurement unit; a speed sensor 638; and an odometer sensor 640. The vehicle 601 also may have a clock 642 that the system architecture uses to determine vehicle time during operation. The clock 642 may be encoded into the vehicle on-board computing device 612, it may be a separate device, or multiple clocks may be available.

The vehicle 601 also may include various sensors that operate to gather information about the environment in which the vehicle is traveling. These sensors may include, for example: a location sensor 660 such as a GPS device; object detection sensors such as one or more cameras 662; a LiDAR sensor system 664; and/or a radar and or and/or a sonar system 666. The sensors also may include environmental sensors 668 such as a precipitation sensor and/or ambient temperature sensor. The object detection sensors may enable the vehicle 601 to detect objects that are within a given distance or range of the vehicle 601 in any direction, while the environmental sensors collect data about environmental conditions within the vehicle's area of travel. The system architecture will also include one or more cameras 662 for capturing images of the environment.

During operations, information is communicated from the sensors to an on-board computing device 612. The on-board computing device 612 analyzes the data captured by the sensors and optionally controls operations of the vehicle based on results of the analysis. For example, the on-board computing device 612 may control braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers such as an auxiliary device controller 614.

Geographic location information may be communicated from the location sensor 620 to the on-board computing device 612, which may then access a map of the environment that corresponds to the location information to determine known fixed features of the environment such as streets, buildings, stop signs and/or stop/go signals. Captured images from the cameras 662 and/or object detection information captured from sensors such as a LiDAR system 664 is communicated from those sensors) to the on-board computing device 612. The object detection information and/or captured images may be processed by the on-board computing device 612 to detect objects in proximity to the vehicle 601. In addition or alternatively, the vehicle 601 may transmit any of the data to a remote server system 503 (FIG. 5) for processing. Any known or to be known technique for making an object detection based on sensor data and/or captured images can be used in the embodiments disclosed in this document.

The on-board computing device 612 may obtain, retrieve, and/or create map data that provides detailed information about the surrounding environment of the autonomous vehicle 601. The on-board computing device 612 may also determine the location, orientation, pose, etc. of the AV in the environment (localization) based on, for example, three dimensional position data (e.g., data from a GPS), three dimensional orientation data, predicted locations, or the like. For example, the on-board computing device 612 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 612 in analyzing the surrounding environment of the autonomous vehicle 601. The map data may also include information and/or rules for determining right of way of objects and/or vehicles in conflicted areas or spaces.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 612 may also include and/or may receive information relating to the trip or route of a user, real-time traffic information on the route, or the like.

The on-board computing device 612 may include and/or may be in communication with a routing controller 631 that generates a navigation route from a start position to a destination position for an autonomous vehicle. The routing controller 631 may access a map data store to identify possible routes and road segments that a vehicle can travel on to get from the start position to the destination position. The routing controller 631 may score the possible routes and identify a preferred route to reach the destination. For example, the routing controller 631 may generate a navigation route that minimizes Euclidean distance traveled or other cost function during the route, and may further access the traffic information and/or estimates that can affect an amount of time it will take to travel on a particular route. Depending on implementation, the routing controller 631 may generate one or more routes using various routing methods, such as Dijkstra's algorithm, Bellman-Ford algorithm, or other algorithms. The routing controller 631 may also use the traffic information to generate a navigation route that reflects expected conditions of the route (e.g., current day of the week or current time of day, etc.), such that a route generated for travel during rush-hour may differ from a route generated for travel late at night. The routing controller 631 may also generate more than one navigation route to a destination and send more than one of these navigation routes to a user for selection by the user from among various possible routes.

In various implementations, an on-board computing device 612 may determine perception information of the surrounding environment of the autonomous vehicle 601. Based on the sensor data provided by one or more sensors and location information that is obtained, the on-board computing device 612 may determine perception information of the surrounding environment of the autonomous vehicle 601. The perception information may represent what an ordinary driver would perceive in the surrounding environment of a vehicle. The perception data may include information relating to one or more objects in the environment of the autonomous vehicle 601. For example, the on-board computing device 612 may process sensor data (e.g., LIDAR or RADAR data, camera images, etc.) in order to identify objects and/or features in the environment of autonomous vehicle 601. The objects may include traffic signals, road way boundaries, other vehicles, pedestrians, and/or obstacles, etc. The on-board computing device 612 may use any now or hereafter known object recognition or detection algorithms, video tracking algorithms, and computer vision algorithms (e.g., track objects frame-to-frame iteratively over a number of time periods) to determine the perception. In an embodiment, the on-board computing device 512 may include an object detector that detects and labels objects.

In some embodiments, the on-board computing device 612 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information. As discussed below in more detail, the on-board computing device 612 may also identify a lane being occupied by an object at any given time.

The on-board computing device 612 may perform one or more prediction and/or forecasting operations. For example, the on-board computing device 612 may predict future locations, trajectories, and/or actions of one or more objects. For example, the on-board computing device 612 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 601, the surrounding environment, and/or their relationship(s). For example, if an object is a vehicle and the current driving environment includes an intersection, the on-board computing device 612 may predict whether the object will likely move straight forward or make a turn. If the perception data indicates that the intersection has no traffic light, the on-board computing device 612 may also predict whether the vehicle may have to fully stop prior to enter the intersection.

The prediction and/or forecasting operations of the on-board computing device 612 can also be used to reduce the number of data samples (e.g., images) that require de novo object recognition to be performed, by tracking previously detected and/or classified objects between frames in a sequence of image frames. In some examples, object tracking can be performed via point tracking, such as by deterministic methods (e.g., with parametric constraints based on the object class of an object) or statistical methods (e.g., Kalman filtering). In some other examples, object tracking can be performed via kernel filtering and kernel tracking, such as using template-based methods or multi-view appearance methods. Optionally, object tracking can be performed via silhouette tracking, such as using shape matching, edge matching, and/or contour tracking. However, object tracking and trajectory prediction and/or determination can be determined using motion analysis or otherwise suitably performed via any suitable method or technique.

In various embodiments, the on-board computing device 612 may determine a motion plan for the autonomous vehicle. For example, the on-board computing device 612 may determine a motion plan for the autonomous vehicle based on the perception data and/or the prediction data. Specifically, given predictions about the future locations of proximate objects and other perception data, the on-board computing device 612 can determine a motion plan for the autonomous vehicle 601 that best navigates the autonomous vehicle relative to the objects at their future locations.

In one or more embodiments, the on-board computing device 612 may receive predictions and make a decision regarding how to handle objects in the environment of the autonomous vehicle 601. For example, for a particular object (e.g., a vehicle with a given speed, direction, turning angle, etc.), the on-board computing device 612 decides whether to overtake, yield, stop, and/or pass based on, for example, traffic conditions, map data, state of the autonomous vehicle, etc. Furthermore, the on-board computing device 612 also plans a path for the autonomous vehicle 601 to travel on a given route, as well as driving parameters (e.g., distance, speed, and/or turning angle). That is, for a given object, the on-board computing device 612 decides what to do with the object and determines how to do it. For example, for a given object, the on-board computing device 612 may decide to pass the object and may determine whether to pass on the left side or right side of the object (including motion parameters such as speed). The on-board computing device 612 may also assess the risk of a collision between a detected object and the autonomous vehicle 601. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 612 may execute one or more control instructions to perform a cautious maneuver (e.g., mildly slow down, accelerate, change lane, or swerve). In contrast, if the collision cannot be avoided, then the on-board computing device 612 may execute one or more control instructions for execution of an emergency maneuver (e.g., brake and/or change direction of travel).

For example, if the on-board computing device 612 determines that based on the object trajectory forecasts, an object is likely to break a right of way agreement with the autonomous vehicle, the on-board computing device 612 may determine a motion plan for the autonomous vehicle that avoids collision with such an object in a conflicted space.

As discussed above, planning and control data regarding the movement of the autonomous vehicle is generated for execution. The on-board computing device 612 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 5, the communications interface 514 may be configured to allow communication between autonomous vehicle 501 and external systems, such as, for example, external devices, sensors, other vehicles, servers, data stores, databases etc. Communications interface 514 may utilize any now or hereafter known protocols, protection schemes, encodings, formats, packaging, etc. such as, without limitation, Wi-Fi, an infrared link, Bluetooth, etc. User interface system 515 may be part of peripheral devices implemented within vehicle 501 including, for example, a keyword, a touch screen display device, a microphone, and a speaker, etc.

Figure 7:
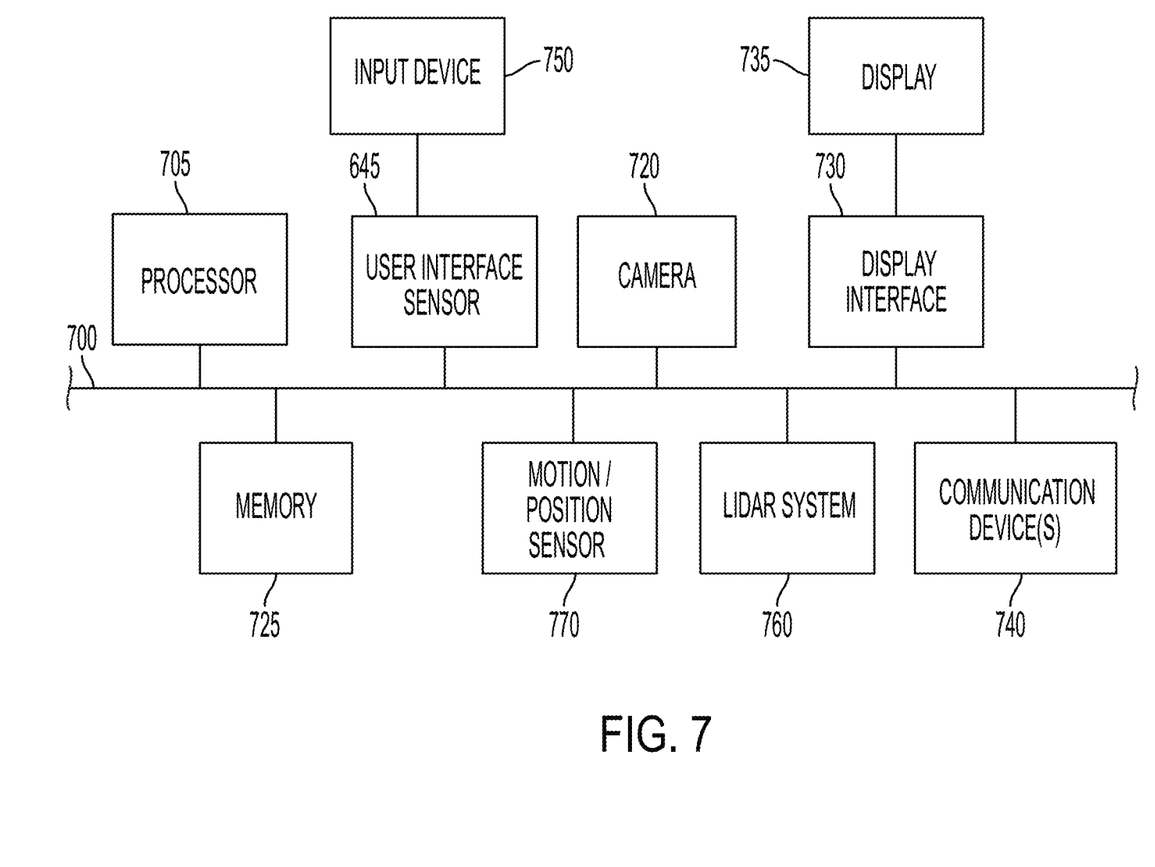
FIG. 7 is a block diagram that illustrates various elements of a possible electronic system, subsystem, controller and/or other component of an AV, and/or external electronic device.

FIG. 7 depicts an example of internal hardware that may be included in any of the electronic components of the system, such as internal processing systems of the AV, external monitoring and reporting systems, or remote servers. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 730 may permit information from the bus 700 to be displayed on a display device 735 in visual, graphic or alphanumeric format, such on an in-dashboard display system of the vehicle. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication system. The communication device(s) 740 may be configured to be communicatively connected to a communications network, such as the Internet, a local area network or a cellular telephone data network.

The hardware may also include a user interface sensor 745 that allows for receipt of data from input devices 750 such as a keyboard or keypad, a joystick, a touchscreen, a touch pad, a remote control, a pointing device and/or microphone. Digital image frames also may be received from a camera 720 that can capture video and/or still images. The system also may receive data from a motion and/or position sensor 770 such as an accelerometer, gyroscope or inertial measurement unit. The system also may receive data from a LiDAR system 760 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

The term "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service.

The term "bounding box" refers to a rectangular box that represents the location of an object. A bounding box may be represented in data by x- and y-axis coordinates $[x_{max}, y_{max}]$ that correspond to a first corner of the box (such as the upper right corner), along with x- and y-axis coordinates $[x_{min}, y_{min}]$ that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera, or points of a point cloud captured by a LiDAR sensor.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" or "communicatively coupled" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method for selecting data for building a machine learning model using active learning, the method comprising:
receiving, from a plurality of sensors, a plurality of unlabeled sensor data logs corresponding to surroundings of an autonomous vehicle;
identifying one or more trends associated with a training dataset comprising a plurality of labeled data logs, the training dataset being used for training a machine learning model;
determining, using the one or more trends, a function for assigning an importance score to each of the plurality of unlabeled sensor data logs;
using the function for assigning the importance score to each of the plurality of unlabeled sensor data logs;
selecting a subset of the plurality of sensor data logs that have an importance score greater than a threshold; and
using the subset of the plurality of sensor data logs for further training the machine learning model trained using the training dataset to generate an updated model.

2. The method of claim 1, further comprising:
identifying, using the machine learning model trained using the training dataset, within each of the plurality of sensor data logs, a bounding box and an associated label;
determining a confidence score of the machine learning model trained using the training dataset for identifying the associated label; and
using the confidence score in determining the function.

3. The method of claim 2, wherein the machine learning model is an object detection model.

4. The method of claim 2, wherein the confidence score is determined based on at least one of the following associated with the machine learning model trained using the training dataset: an actual accuracy; a desired accuracy; a false positive rate; a false negative rate; a convergence; an output; a statistical fit; identification of a problem being solved; or a training status.

5. The method of claim 2, further comprising:
receiving metadata associated with each of the plurality of labeled data logs in the training data sets; and
using the metadata for identifying the one or more trends.

6. The method of claim 5, wherein the metadata comprises at least one of the following: a time of capture of a data log; a location of capture of a data log; information relating to environmental conditions at a location or time of capture of a data log; or information relating to one or more events a location or time of capture of a data log.

7. The method of claim 2, wherein the one or more trends are used to identify one or more characteristics in the plurality labeled data logs of the training dataset that are underrepresented.

8. The method of claim 7, wherein the one or more characteristics are selected from at least one of the following: a label class count; a label count by time; a label count by location; an event class count; an event class count by time; an event class count by location; an instance count by environmental conditions; or a machine leaning model uncertainty.

9. The method of claim 2, further comprising receiving metadata associated with the sensor data logs, the metadata comprising at least one of the following: a time of capture of a data log; a location of capture of a data log; information relating to environmental conditions at a location or time of capture of a data log; or information relating to one or more events a location or time of capture of a data log.

10. The method of claim 9, further comprising using the function for assigning the importance score to each of the plurality of unlabeled sensor data logs by assigning a score to one or more of a plurality of characteristics of the data log, the plurality of characteristics comprising at least one of the following: a label class count; a label count by time; a label count by location; an event class count; an event class count by time; an event class count by location; an instance count by environmental conditions; or a machine leaning model uncertainty.

11. The method of claim 2, further comprising discarding one or more of the plurality of sensor data logs that have an importance score less than the threshold.

12. A system for selecting data for training a machine learning model using active learning, the system comprising:
a processor; and
a non-transitory computer-readable medium comprising one or more programming instructions that when executed by the processor, cause the processor to:
receive, from a plurality of sensors of an autonomous vehicle, a plurality of unlabeled sensor data logs corresponding to surroundings of the autonomous vehicle;
identify one or more trends associated with a training dataset comprising a plurality of labeled data logs, the training dataset being used for training a machine learning model;
determine, using the one or more trends, a function for assigning an importance score to each of the plurality of unlabeled sensor data logs;
use the function for assigning the importance score to each of the plurality of unlabeled sensor data logs;
select a subset of the plurality of sensor data logs that have an importance score greater than a threshold; and
use the subset of the plurality of sensor data logs for further training the machine learning model trained using the training dataset to generate an updated model.

13. The system of claim 12, further comprising programming instructions that when executed by the processor, cause the processor to:
identify, using the machine learning model trained using the training dataset, within each of the plurality of sensor data logs, a bounding box and an associated label;
determine a confidence score of the machine learning model trained using the training dataset for identifying the associated label; and
use the confidence score in determining the function.

14. The system of claim 13, wherein the machine learning model is an object detection model.

15. The system of claim 13, wherein the confidence score is determined based on at least one of the following associated with the machine learning model trained using the training dataset: an actual accuracy; a desired accuracy; a false positive rate; a false negative rate; a convergence; an output; a statistical fit; identification of a problem being solved; or a training status.

16. The system of claim 13, further comprising programming instructions that when executed by the processor, cause the processor to:
receive metadata associated with each of the plurality of labeled data logs in the training data sets; and
use the metadata for identifying the one or more trends.

17. The system of claim 16, wherein the metadata comprises at least one of the following: a time of capture of a data log; a location of capture of a data log; information relating to environmental conditions at a location or time of capture of a data log; or information relating to one or more events a location or time of capture of a data log.

18. The system of claim 13, wherein the one or more trends are used to identify one or more characteristics in the plurality labeled data logs of the training dataset that are underrepresented.

19. The system of claim 18, wherein the one or more characteristics are selected from at least one of the following: a label class count; a label count by time; a label count by location; an event class count; an event class count by time; an event class count by location; an instance count by environmental conditions; or a machine leaning model uncertainty.

20. The system of claim 12, further comprising programming instructions that when executed by the processor, cause the processor to receive metadata associated with the sensor data logs, the metadata comprising at least one of the following: a time of capture of a data log; a location of capture of a data log; information relating to environmental conditions at a location or time of capture of a data log; or information relating to one or more events a location or time of capture of a data log.

21. The system of claim 20, further comprising programming instructions that when executed by the processor, cause the processor to use the function for assigning the importance score to each of the plurality of unlabeled sensor data logs by assigning a score to one or more of a plurality of characteristics of the data log, the plurality of characteristics comprising at least one of the following: a label class count; a label count by time; a label count by location; an event class count; an event class count by time; an event class count by location; an instance count by environmental conditions; or a machine leaning model uncertainty.

22. The system of claim 12, further comprising programming instructions that when executed by the processor, cause the processor to discard one or more of the plurality of sensor data logs that have an importance score less than the threshold.

* * * * *